(12) United States Patent
Chamosset et al.

(10) Patent No.: US 7,861,604 B2
(45) Date of Patent: Jan. 4, 2011

(54) TURBINE WATER METER HAVING SPINNER BLADES WITH SEMI-PARABOLIC EDGES AND MECHANICAL REINFORCING ELEMENTS

(75) Inventors: Jérôme Chamosset, Macon (FR); Arnaud Darras, Lyons (FR)

(73) Assignee: Actaris S.A.S., Boulogne-Billancourt (FR)

( * ) Notice: Subject to any disclaimer, the term of this patent is extended or adjusted under 35 U.S.C. 154(b) by 351 days.

(21) Appl. No.: 12/085,714

(22) PCT Filed: Dec. 14, 2006

(86) PCT No.: PCT/FR2006/051351

§ 371 (c)(1),
(2), (4) Date: May 28, 2008

(87) PCT Pub. No.: WO2007/074270

PCT Pub. Date: Jul. 5, 2007

(65) Prior Publication Data

US 2009/0272199 A1 Nov. 5, 2009

(30) Foreign Application Priority Data

Dec. 20, 2005 (FR) .................................. 05 53973

(51) Int. Cl.
*G01F 1/05* (2006.01)
*B64C 11/16* (2006.01)
*F04D 29/18* (2006.01)

(52) U.S. Cl. ............................... 73/861.79; 416/223 R; 416/97 R

(58) Field of Classification Search ................... None
See application file for complete search history.

(56) References Cited

U.S. PATENT DOCUMENTS

| 4,187,847 | A | * | 2/1980 | Loeser | 604/134 |
| 4,451,207 | A | * | 5/1984 | Hoffmann | 416/237 |
| 4,570,497 | A | * | 2/1986 | Han | 73/861.79 |
| 4,700,579 | A | * | 10/1987 | Hall | 73/861.78 |
| 4,825,708 | A | * | 5/1989 | Sevick | 73/861.77 |
| 5,046,370 | A | * | 9/1991 | Hall | 73/861.89 |
| 5,341,686 | A | * | 8/1994 | Chai | 73/861.33 |
| 5,636,178 | A | * | 6/1997 | Ritter | 367/83 |
| 5,939,644 | A | * | 8/1999 | Hsu | 73/861.79 |
| 7,563,073 | B1 | * | 7/2009 | Liang | 416/97 R |
| 7,625,180 | B1 | * | 12/2009 | Liang | 416/97 R |
| 7,762,775 | B1 | * | 7/2010 | Liang | 416/97 R |
| 2004/0144427 | A1 | | 7/2004 | George | 137/499 |

FOREIGN PATENT DOCUMENTS

| FR | 2673293 | 8/1992 |
| GB | 470963 | 8/1937 |
| GB | 2388193 | 11/2003 |
| JP | 2002039817 | 2/2002 |

OTHER PUBLICATIONS

International Search Report dated Apr. 26, 2007.

* cited by examiner

*Primary Examiner*—Harshad Patel
(74) *Attorney, Agent, or Firm*—Dority & Manning, P.A.

(57) ABSTRACT

A turbine water meter includes plural spinner blades rotatably mounted in a chamber. The respective blades have cross-sections with semi-parabolic edges, with each blade having respective elements connected together by mechanical reinforcing elements.

4 Claims, 2 Drawing Sheets

TURBINE WATER METER HAVING SPINNER BLADES WITH SEMI-PARABOLIC EDGES AND MECHANICAL REINFORCING ELEMENTS

RELATED APPLICATIONS

This application is a National Phase application of PCT/FR2006/051351, filed on Dec. 14, 2006, which in turn claims the benefit of priority from French Patent Application No. 05 53973, filed on Dec. 20, 2006, the entirety of which is incorporated herein by reference

FIELD OF THE INVENTION

The invention relates to a spinner for a fluid meter, in particular a water meter.

BACKGROUND

One such known spinner is shown diagrammatically in plan view in FIG. 1, installed in a vessel.

In a water meter, such a spinner 1 is disposed in a cylindrical portion, referred to as a chamber, of a vessel 2 that provides a leaktight connection with water inlet and outlet pipes. The spinner is mounted on an axis of rotation 3 substantially centered on the chamber, and the water entering via the inlet tube 4 of the vessel drives the spinner in rotation and then leaves via the outlet tube 5 of the vessel.

The inclination of the spinner blades is selected so as to reduce the opposing hydraulic torque. The number of spinner blades is selected as a function of the chamber so as to ensure that there is always at least one driving blade.

OBJECTS AND SUMMARY

The object of the invention is to obtain an optimum reduction in the hydraulic braking of such a spinner.

Optimizing the shape and the arrangement of the blades enables the action of water on each blade to be increased and thus enables the driving torque on the axis of the spinner to be increased, the purpose of the improvement being to ensure the speed of rotation of the spinner remains proportional to flow rate over a wider range of flow rates.

Patent document GB 470 963 discloses using solid blades presenting a cross-section with curved edges and in which the free tip is shaped to be tangential to the wall of the chamber.

Such solid blades are heavy and, when the spinner is turning while bearing against its pivot, friction is relatively high.

In addition, such blades are relatively difficult to fabricate.

The invention solves these problems, and to do so it provides a spinner for a fluid meter, in particular a water meter, the spinner being designed to be mounted to rotate in a cylindrical chamber of a meter vessel and comprising a plurality of blades, each blade presenting a cross-section with semi-parabolic edges and having a free tip shaped to be tangential to the wall of said chamber, the spinner being characterized in that each blade is constituted by two semi-parabolic walls connected together by mechanical reinforcement elements.

The semi-parabolic shape enables the direction of the speed of the fluid to be brought progressively to be parallel to the direction sought at the free tip of each blade.

In the chamber, the fluid rotates about the axis of the spinner and the direction of its speed in the region close to the wall of the chamber is tangential thereto. By means of the invention, turbulence, which increases with the gradient of the speed vector, is thus diminished.

The fact that the spinner is made of fine walls makes it easier to develop the mold for fabricating it and makes it possible to obtain a fabrication method that is repeatable.

The advantage of this embodiment is also that it reduces the mass and thus the weight in water of the spinner, and consequently reduces friction on the bearings and the pivot.

Preferably, said reinforcement elements are constituted by tubular elements of circular cross-section.

These reinforcement elements present the advantage of being suitable for use as bearing points for ejectors during molding of the spinner, which is advantageously made of plastics material.

The invention also provides a fluid meter, in particular a water meter, fitted with such a spinner, and characterized in that said spinner is mounted to rotate in a single-jet cylindrical measurement chamber.

BRIEF DESCRIPTION OF THE DRAWINGS

The invention is described below in greater detail with the help of figures that merely show a preferred embodiment of the invention.

DETAILED DESCRIPTION

As shown, mounted in a single-jet cylindrical measurement chamber of a vessel 2 of a fluid meter, in particular of a water meter, a spinner 1 in accordance with the invention comprises a plurality of blades 10, e.g. seven blades, each presenting a cross-section with edges that are semi-parabolic, and with free tips shaped to be tangential to the wall of the chamber.

Because of this rounded shape of the blades, the opposing torque is reduced and the sensitivity of the meter is increased.

Without modifying the configuration of the meter vessel and using bearings that are identical, this rounded shape for the blades enables the spinner to turn faster. The fact that the spinner turns faster than the above-described known spinner of the prior art means that it is subjected to less hydraulic braking, which has the consequence of a lower starting flow rate, thus making it possible to make available a greater product dynamic range at low flow rates.

Figure 1:
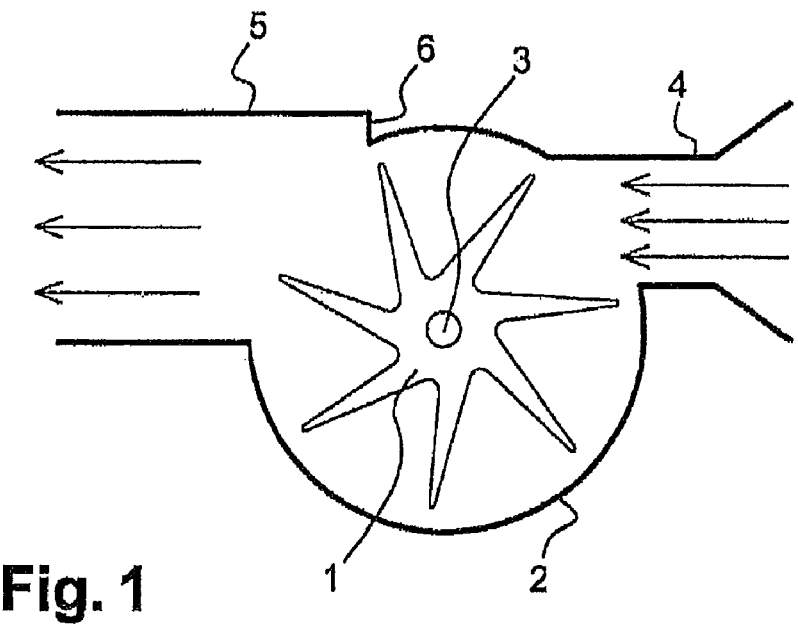
FIG. 1, mentioned above, is a diagram showing a spinner of the prior art.
Figure 2:
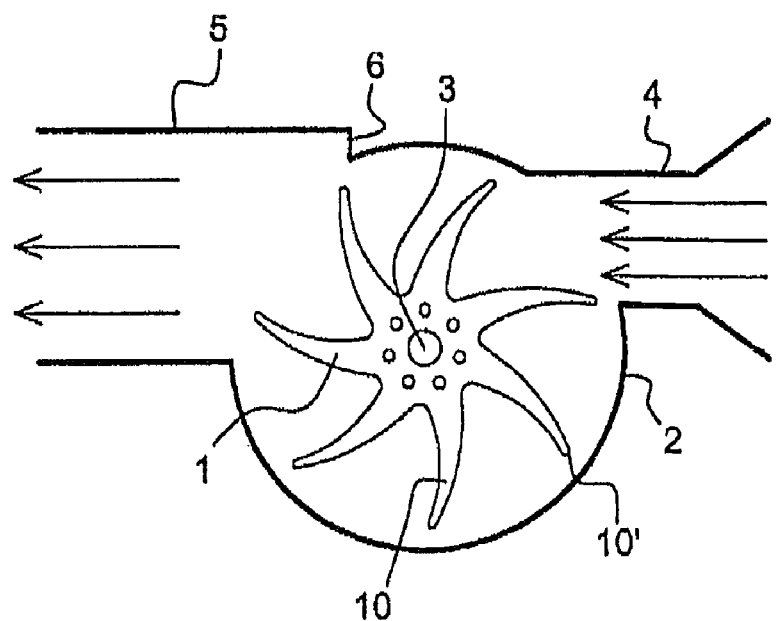
FIG. 2 is a diagram showing a spinner of the invention.
Figure 3:
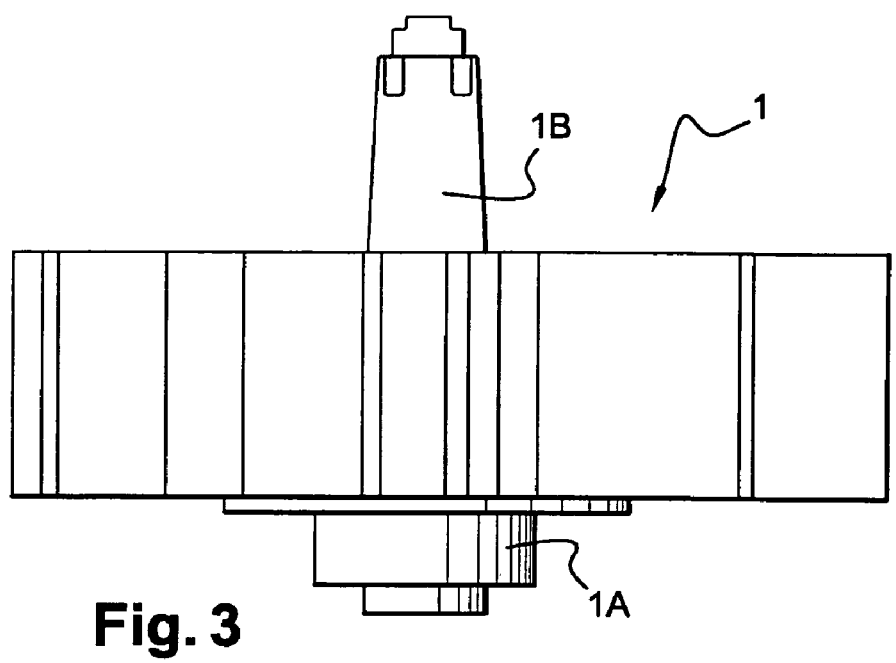
FIG. 3 is a plan view of a spinner in accordance with the invention.
Figure 4:
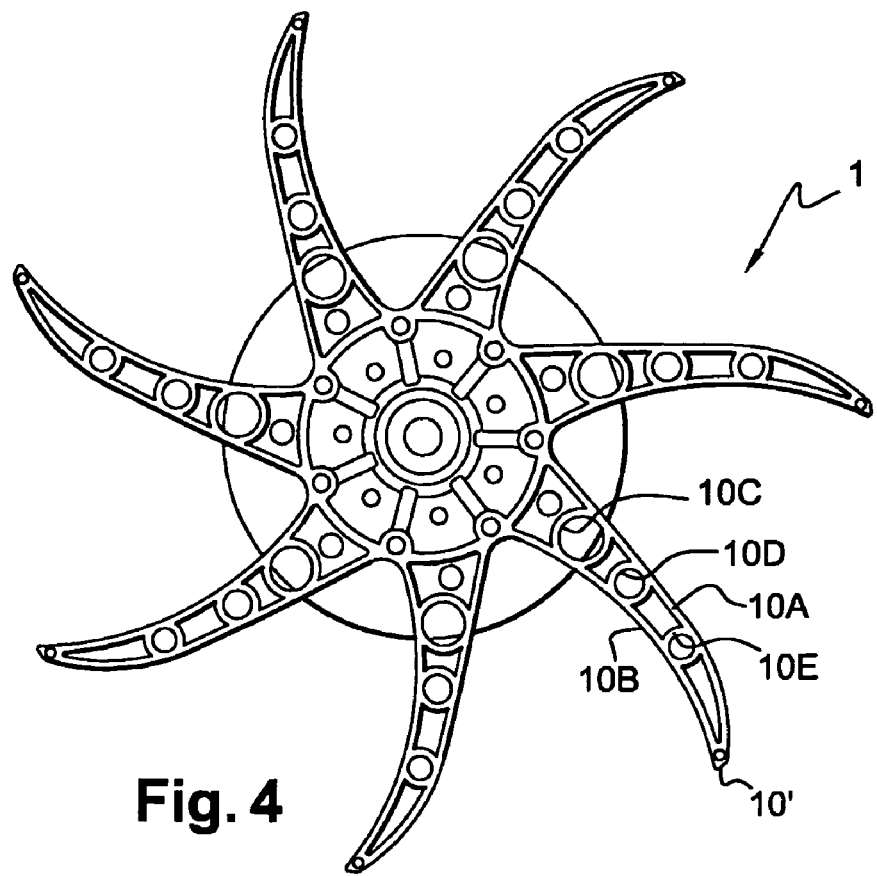
FIG. 4 is a face view of a spinner in accordance with the invention.

FIGS. 3 and 4 show a spinner of the invention in greater detail.

In known manner, the spinner made of plastics material, e.g. of filled polypropylene, comprises a bottom cylindrical portion 1A that is to form a bottom bearing, and a top conical portion 1B acting as a top bearing. The top portion 1B also provides a connection with the counter of the meter, so as to enable the flow to be measured and metered.

The spinner in accordance with the invention may be used to measure high rates that may be as much as 230 cubic meters per hour ($m^3/h$) and may have a diameter of the order of 25 centimeters (cm).

Each blade is constituted by two semi-parabolic walls 10A, 10B, interconnected by mechanical reinforcement elements 10C, 10D, 10E that are constituted by tubular elements of circular cross-section. These reinforcement elements are distributed along the length of the blade to match force distribution.

The invention claimed is:

1. A spinner for a fluid meter the spinner being designed to be mounted to rotate in a cylindrical chamber of a meter vessel and comprising:

a plurality of blades, each blade presenting a cross-section with semi-parabolic edges and having a free tip shaped to be tangential to the wall of said chamber, wherein each blade is constituted by two semi-parabolic walls connected together by mechanical reinforcement elements.

2. A spinner according to claim 1, wherein said reinforcement elements are constituted by tubular elements of circular cross-section.

3. A spinner according to claim 1, wherein the spinner is made of plastics material.

4. A fluid meter fitted with a spinner in accordance with claim 1, and wherein said spinner is mounted to rotate in a single-jet cylindrical measurement chamber.

* * * * *